US012431061B2

(12) United States Patent
Kim et al.

(10) Patent No.: US 12,431,061 B2
(45) Date of Patent: Sep. 30, 2025

(54) DISPLAY DEVICE OPERATED WITH VARIABLE REFRESH RATE AND METHOD OF DRIVING THE SAME

(71) Applicant: LG Display Co., Ltd., Seoul (KR)

(72) Inventors: So-Jeong Kim, Paju-si (KR); Nak-Yoon Kim, Paju-si (KR); Chan Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 36 days.

(21) Appl. No.: 18/517,050

(22) Filed: Nov. 22, 2023

(65) Prior Publication Data

US 2024/0203319 A1 Jun. 20, 2024

(30) Foreign Application Priority Data

Dec. 15, 2022 (KR) ........................ 10-2022-0175894

(51) Int. Cl.
*G09G 3/20* (2006.01)
*G09G 3/3258* (2016.01)

(52) U.S. Cl.
CPC ......... *G09G 3/2096* (2013.01); *G09G 3/3258* (2013.01); *G09G 2300/0842* (2013.01); *G09G 2310/08* (2013.01); *G09G 2320/0252* (2013.01); *G09G 2320/0261* (2013.01); *G09G 2320/041* (2013.01); *G09G 2330/021* (2013.01); *G09G 2340/0435* (2013.01); *G09G 2354/00* (2013.01); *G09G 2360/18* (2013.01)

(58) Field of Classification Search
CPC ................. G09G 2340/0435; G09G 2320/041
See application file for complete search history.

(56) References Cited

U.S. PATENT DOCUMENTS

| | | | | |
|---|---|---|---|---|
| 6,930,667 B1 * | 8/2005 | Iijima | G09G 3/3622 345/204 |
| 11,545,083 B2 | 1/2023 | Chung et al. | |
| 2016/0078838 A1 * | 3/2016 | Huang | G09G 5/00 345/520 |
| 2022/0223092 A1 * | 7/2022 | Lee | G09G 3/2007 |
| 2023/0028898 A1 * | 1/2023 | Xu | G09G 5/395 |

FOREIGN PATENT DOCUMENTS

| | | |
|---|---|---|
| KR | 20110034948 A | 4/2011 |
| KR | 20220041509 A | 4/2022 |
| KR | 20220095902 A | 7/2022 |

* cited by examiner

*Primary Examiner* — Yuzhen Shen
(74) *Attorney, Agent, or Firm* — Seed Intellectual Property Law Group LLP

(57) ABSTRACT

A display device includes a display panel displaying an image using a gate signal and a data signal. The display device includes a gate driving circuit generating the gate signal using a gate control signal. The display device includes a data driving circuit generating the data signal using a data control signal and an image data Application. The display device includes a timing controlling circuit generating the gate control signal, the data control signal, and the image data using an image signal and a plurality of timing signals. The timing controlling circuit is further configured to transmit the gate control signal, the data control signal, and the image data with a variable refresh rate profile different based on a temperature.

17 Claims, 10 Drawing Sheets

| | | refresh rate(Hz) | |
|---|---|---|---|
| with or without touch sensing | | O | X |
| | generic UI | 10~120 | 10,20(watch) |
| | SNS | 10~120 | 10 |
| | YouTube | 30~120 | 30~120 |
| | moving image | 30~120 | 30~60 |
| | camera | 30~120 | 30~60 |

| | ΔL/Lw(%) | | | | | | | |
|---|---|---|---|---|---|---|---|---|
| temperature | F1 | F2 | F3 | F4 | F5 | F6 | F7 | F8 |
| 10℃ | 32.10 | 4.09 | 1.60 | 1.07 | 0.83 | 0.62 | 0.68 | 0.65 |
| 25℃ | 38.05 | 5.16 | 1.71 | 0.96 | 0.68 | 0.65 | 0.54 | 0.66 |
| 40℃ | 43.08 | 6.20 | 1.50 | 0.94 | 0.56 | 0.54 | 0.63 | 0.56 |

FIG. 6B

| | ΔL/Lw(%) | | | | | | | |
|---|---|---|---|---|---|---|---|---|
| refresh rate | F1 | F2 | F3 | F4 | F5 | F6 | F7 | F8 |
| 1Hz | 41.6 | 6.01 | 1.67 | 0.93 | 0.70 | 0.49 | 0.49 | 0.51 |
| 5Hz | 4.23 | 3.53 | 1.71 | 0.53 | 0.63 | 0.53 | 0.43 | 0.48 |
| 10Hz | 3.80 | 3.16 | 1.67 | 0.88 | 0.69 | 0.55 | 0.51 | 0.48 |
| 20Hz | 3.35 | 2.79 | 1.40 | 0.88 | 0.52 | 0.52 | 0.48 | 0.46 |
| 60Hz | 3.21 | 2.67 | 1.34 | 0.70 | 0.52 | 0.55 | 0.47 | 0.48 |

FIG. 7

| | | standby mode | touch mode | | | | | | | | standby mode |
|---|---|---|---|---|---|---|---|---|---|---|---|
| low temperature (equal to or lower than 10°C) | refresh rate(Hz) | 1 | 10 | 20 | 20 | 30 | 40 | 30 | 20 | 120 | 1 |
| | frame number | ∞ | 1 | 1 | 1 | 1 | 1 | 1 | 1 | 1 | ∞ |
| | time(msec) | ∞ | 100.0 | 50.0 | 16.7 | 33.3 | 25.0 | 33.3 | 50.0 | 8.3 | ∞ |
| room temperature (higher than 10°C and lower than 50°C) | refresh rate(Hz) | 2 | 11 | 21 | 61 | 31 | 41 | 31 | 21 | 120 | 2 |
| | frame number | ∞ | 1 | 1 | 1 | 1 | 1 | 1 | 1 | 1 | ∞ |
| | time(msec) | ∞ | 90.9 | 47.6 | 16.4 | 32.3 | 24.4 | 32.3 | 47.6 | 8.3 | ∞ |
| high temperature (equal to or higher than 50°C) | refresh rate(Hz) | 4 | 13 | 23 | 63 | 33 | 43 | 33 | 23 | 120 | 4 |
| | frame number | ∞ | 1 | 1 | 1 | 1 | 1 | 1 | 1 | 1 | ∞ |
| | time(msec) | ∞ | 76.9 | 43.5 | 15.9 | 30.3 | 23.3 | 30.3 | 43.5 | 8.3 | ∞ |

FIG. 8

| | | standby mode | touch mode | | | | | | | | | | | | | standby mode |
|---|---|---|---|---|---|---|---|---|---|---|---|---|---|---|---|---|
| low temperature (equal to or lower than 10℃) | refresh rate(Hz) | 1 | 10 | 20 | 60 | 30 | 40 | 30 | 20 | 120 | 20 | 30 | 40 | 80 | 10 | 1 |
| | frame number | ∞ | 1 | 1 | 1 | 1 | 1 | 1 | 1 | 1 | 1 | 1 | 1 | 1 | 1 | ∞ |
| | time(msec) | ∞ | 100.0 | 50.0 | 16.7 | 33.3 | 25.0 | 33.3 | 50.5 | 8.3 | 50.0 | 33.3 | 25.0 | 13.0 | 100.0 | ∞ |
| room temperature (higher than 10℃ and lower than 50℃) | refresh rate(Hz) | 1 | 20 | 20 | 60 | 30 | 40 | 30 | 20 | 120 | 20 | 30 | 40 | 80 | 10 | 1 |
| | frame number | ∞ | 2 | 1 | 1 | 1 | 1 | 1 | 1 | 1 | 1 | 1 | 1 | 1 | 1 | ∞ |
| | time(msec) | ∞ | 100.0 | 50.0 | 17.0 | 33.3 | 25.0 | 33.3 | 50.5 | 8.3 | 50.0 | 33.3 | 25.0 | 13.0 | 100.0 | ∞ |
| high temperature (equal to or higher than 50℃) | refresh rate(Hz) | 1 | 40 | 20 | 60 | 30 | 40 | 30 | 20 | 120 | 20 | 30 | 40 | 80 | 10 | 1 |
| | frame number | ∞ | 4 | 1 | 1 | 1 | 1 | 1 | 1 | 1 | 1 | 1 | 1 | 1 | 1 | ∞ |
| | time(msec) | ∞ | 100.0 | 50.0 | 17.0 | 33.3 | 25.0 | 33.3 | 50.5 | 8.3 | 50.0 | 33.3 | 25.0 | 13.0 | 100.0 | ∞ |

DISPLAY DEVICE OPERATED WITH VARIABLE REFRESH RATE AND METHOD OF DRIVING THE SAME

CROSS-REFERENCE TO RELATED APPLICATIONS

The present application claims the priority benefit of Korean Patent Application No. 10-2022-0175894, filed in Republic of Korea on Dec. 15, 2022, which is hereby incorporated by reference herein in its entirety into the present application.

BACKGROUND

Technical Field

The present disclosure relates to a display device, and more particularly, to a display device driven with a variable refresh rate different according to a temperature and a method of driving the display device.

Description of the Related Art

Recently, with the advent of an information-oriented society, the interest in information displays for processing and displaying a massive amount of information and the demand for portable information media have increased. As such, a display field has rapidly advanced. Thus, various light and thin flat panel display devices have been developed and highlighted.

Among the various flat panel display devices, a liquid crystal display (LCD) device displays an image by adjusting a transmittance of a light of a backlight unit using a liquid crystal layer, and an organic light emitting diode (OLED) display device displays an image by adjusting a luminance of a light emitted from a light emitting diode using a current.

BRIEF SUMMARY

In the flat panel display device, an image may be consecutively and smoothly displayed by modulating a refresh rate (a frequency) according to a mode. For example, the flat panel display device may operate with about 60 Hz in a real use mode and may operate with about 1 Hz in a standby mode. Meanwhile, a multi-frame response (MFR) property of the flat panel display device is deteriorated according to a temperature. As a result, deterioration such as a motion blur occurs and a front of screen (FOS) property is deteriorated. Accordingly, the present disclosure is directed to a display device that substantially obviates one or more of the problems due to limitations and disadvantages of the related art.

Various embodiments of the present disclosure provide a display device where deterioration such as a motion blur is prevented and a power consumption is reduced by operating with a variable refresh rate profile different according to a temperature in a standby mode and a touch mode and a method of driving the display device.

Various embodiments of the present disclosure provide a display device where a natural image is displayed by operating with a refresh rate and a frame number different according to a temperature at a start of a touch mode and a method of driving the display device.

Additional features and advantages of the disclosure will be set forth in the description which follows, and in part will be apparent from the description, or can be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a display device includes: a display panel displaying an image using a gate signal and a data signal; a gate driving circuit generating the gate signal using a gate control signal; a data driving circuit generating the data signal using a data control signal and an image data; and a timing controlling circuit generating the gate control signal, the data control signal and the image data using an image signal and a plurality of timing signals and transmitting the gate control signal, the data control signal and the image data with a variable refresh rate profile different according to a temperature.

In another aspect, a method of driving a display device includes: generating a gate control signal, a data control signal and an image data using an image signal and a plurality of timing signals by a timing controlling circuit; transmitting the gate control signal, the data control signal and the image data with a variable refresh rate profile different according to a temperature by the timing controlling circuit; generating a data signal using the data control signal and the image data by a data driving circuit; generating a gate signal using the gate control signal by a gate driving circuit; and displaying an image using the gate signal and the data signal by a display panel.

It is to be understood that both the foregoing general description and the following detailed description are explanatory and are intended to provide further explanation of the disclosure as claimed.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings:

FIGS. 5A and 5B are a graph and a table, respectively, showing a multi-frame response property according to a temperature of a display device according to a first embodiment of the present disclosure;

FIGS. 6A and 6B are a graph and a table, respectively, showing a multi-frame response property according to a refresh rate of a display device according to a first embodiment of the present disclosure;

FIG. 7 is a view showing a variable refresh rate profile with respect to a temperature of a display device according to a first embodiment of the present disclosure;

FIG. 8 is a view showing a variable refresh rate profile with respect to a temperature of a display device according to a second embodiment of the present disclosure.

DETAILED DESCRIPTION

Figure 1:
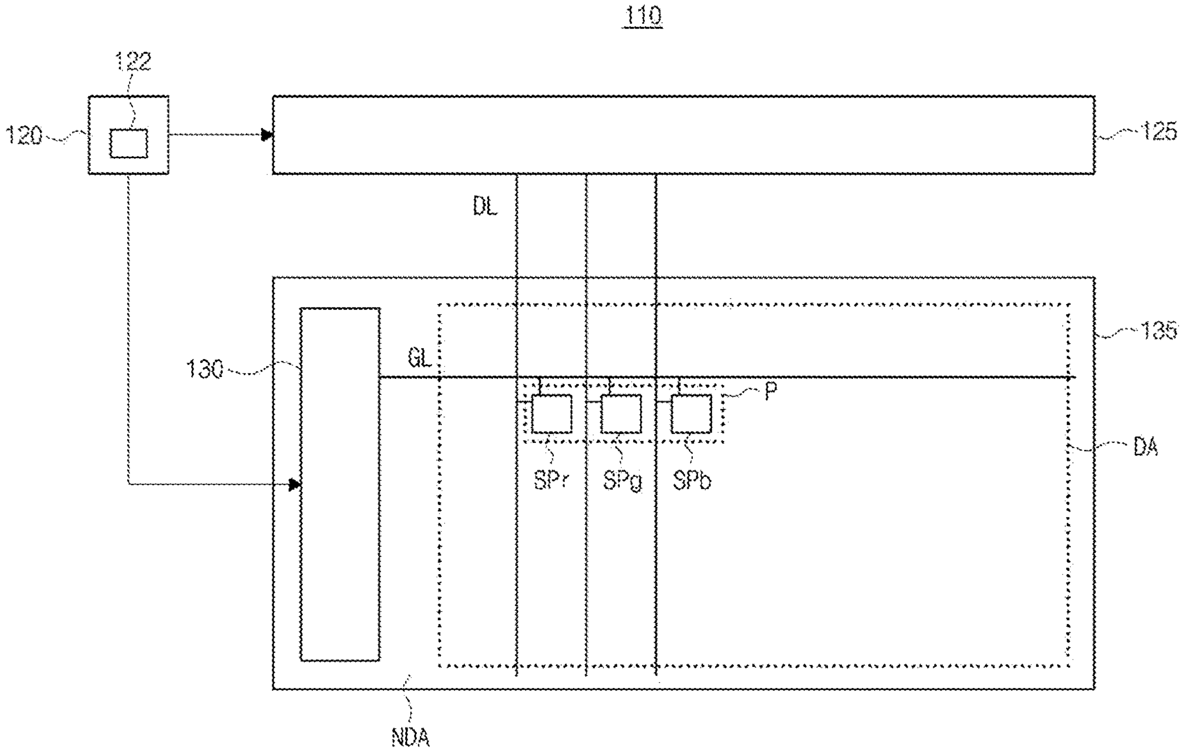
FIG. 1 is a view showing a display device according to a first embodiment of the present disclosure.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure can be sufficiently thorough and complete to assist those skilled in the art to fully understand the scope of the present disclosure.

The shapes, sizes, ratios, angles, numbers, and the like, which are illustrated in the drawings to describe various example embodiments of the present disclosure, are merely given by way of example. Therefore, the present disclosure is not limited to the illustrations in the drawings. Like reference numerals refer to like elements throughout the specification, unless otherwise specified.

In the following description, where the detailed description of the relevant known function or configuration may unnecessarily obscure a feature or aspect of the present disclosure, a detailed description of such known function or configuration may be omitted or a brief description may be provided.

Where the terms "comprise," "have," "include," and the like are used, one or more other elements may be added unless the term, such as "only," is used. An element described in the singular form is intended to include a plurality of elements, and vice versa, unless the context clearly indicates otherwise.

In construing an element, the element is to be construed as including an error or a tolerance range even where no explicit description of such an error or tolerance range is provided.

Where positional relationships are described, for example, where the positional relationship between two parts is described using "on," "over," "under," "above," "below," "beside," "next," or the like, one or more other parts may be located between the two parts unless a more limiting term, such as "immediate(ly)," "direct(ly)," or "close(ly)" is used. For example, where an element or layer is disposed "on" another element or layer, a third layer or element may be interposed therebetween.

Although the terms "first," "second," A, B, (a), (b), and the like may be used herein to refer to various elements, these elements should not be interpreted to be limited by these terms as they are not used to define a particular order or precedence. These terms are only used to distinguish one element from another. For example, a first element could be termed a second element, and, similarly, a second element could be termed a first element, without departing from the scope of the present disclosure.

The term "at least one" should be understood to include all combinations of one or more of related elements. For example, the term of "at least one of first, second and third elements" may include all combinations of two or more of the first, second and third elements as well as the first, second or third element.

The term "display device" May include a display device in a narrow sense such as liquid crystal module (LCM), an organic light emitting diode (OLED) module and a quantum dot (QD) module including a display panel and a driving circuit for driving the display panel. In addition, the term "display device" May include a complete product (or a final product) including the LCM, the OLED module and the QD module such as a notebook computer, a television, a computer monitor, an equipment display device including an automotive display apparatus or a shape other than a vehicle, and a set electronic apparatus or a set device (or a set apparatus) such as a mobile electronic apparatus of a smart phone or an electronic pad.

Accordingly, a display device of the present disclosure may include an applied product or a set device of a final user's device including the LCM, the OLED module and the QD module as well as a display device in a narrow sense such as the LCM, the OLED module and the QD module.

According to circumstances, the LCM, the OLED module and the QD module having a display panel and a driving circuit may be expressed as "a display device," and an electronic apparatus of a complete product including the LCM, the OLED module and the QD module may be expressed as "a set device." For example, a display device in a narrow sense may include a display panel of a liquid crystal, an organic light emitting diode and a quantum dot and a source printed circuit board (PCB) of a control circuit for driving the display panel, and a set device may further include a set PCB of a set control circuit electrically connected to the source PCB for controlling the entire set device.

The display panel of the present disclosure may include all kinds of display panels such as a liquid crystal display panel, an organic light emitting diode display panel, a quantum dot display panel and an electroluminescent display panel. The display panel of the present disclosure is not limited to a specific display panel of a bezel bending having a flexible substrate for an organic light emitting diode display panel and a lower back plate supporter. A shape or a size of the display panel for the display device of the present disclosure is not limited thereto.

For example, when the display panel is an organic light emitting diode display panel, the display panel may include a plurality of gate lines, a plurality of data lines and a subpixel in a crossing region of the plurality of gate lines and the plurality of data lines. The display panel may include an array having a thin film transistor of an element for selectively applying a voltage to each subpixel, an emitting element layer on the array and an encapsulating substrate or an encapsulation part covering the emitting element layer. The encapsulation part may protect the thin film transistor and the emitting element layer from an external impact and may prevent or at least reduce penetration of a moisture or an oxygen into the emitting element layer. In addition, a layer on the array may include an inorganic light emitting layer, for example, a nano-sized material layer or a quantum dot.

The thin film transistor of the present disclosure may include one of an oxide thin film transistor, an amorphous silicon thin film transistor, a low temperature polycrystalline silicon thin film transistor.

Features of various embodiments of the present disclosure may be partially or entirely coupled to or combined with each other. They may be linked and operated technically in various ways as those skilled in the art can sufficiently understand. The embodiments may be carried out independently of or in association with each other in various combinations.

Hereinafter, a display device according to various example embodiments of the present disclosure where an influence on an oxide semiconductor layer of a thin film transistor of a driving element part is reduced by shielding a light emitted and transmitted from a subpixel and/or a light inputted from an exterior will be described in detail with reference to the accompanying drawings.

FIG. 1 is a view showing a display device according to a first embodiment of the present disclosure. The display device may be an organic light emitting diode (OLED) display device.

In FIG. 1, a display device 110 according to a first embodiment of the present disclosure includes a timing controlling circuit 120, a data driving circuit 125, a gate driving circuit 130 and a display panel 135.

The timing controlling circuit 120 generates an image data, a data control signal and a gate control signal using an image signal and a plurality of timing signals including a data enable signal, a horizontal synchronization signal, a vertical synchronization signal and a clock signal transmitted from an external system such as a graphic card or a television system. The image data and the data control signal are transmitted to the data driving circuit 125, and the gate control signal is transmitted to the gate driving circuit 130.

The timing controlling circuit 120 includes a refresh rate modulating part 122. The refresh rate modulating part 122 supplies a variable refresh rate (VRR) profile different according to a temperature (an atmosphere temperature or a temperature of the data driving circuit 125), and the timing controlling circuit 120 transmits the image data, the data control signal and the gate control signal according to the different variable refresh rate profile.

The display device 110 may include a temperature sensor sensing a temperature.

The data driving circuit 125 generates a data signal (a data voltage) using the data control signal and the image data transmitted from the timing controlling circuit 120 and transmits the data signal to a data line DL of the display panel 135.

The gate driving circuit 130 generate a gate signal (a gate voltage) using the gate control signal transmitted from the timing controlling circuit 120 and applies the gate signal to a gate line GL of the display panel 135. The gate driving circuit 130 generates an emission signal according to a structure of each of red, green and blue subpixels SPr, SPg and SPb and supplies the emission signal to the display panel 135.

The gate driving circuit 130 may have a gate in panel (GIP) type to be formed in a non-display area NDA of a substrate of the display panel 135 having the gate line GL, the data line DL and a pixel P.

The display panel 135 includes a display area DA at a central portion thereof and a non-display area NDA adjacent to and surrounding the display area DA. The display panel 135 displays an image using the gate signal and the data signal. For displaying an image, the display panel 135 includes a plurality of pixels P, a plurality of gate lines GL and a plurality of data lines DL in the display area DA.

Each of the plurality of pixels P includes red, green and blue subpixels SPr, SPg and SPb, and the gate line GL and the data line DL cross each other to define the red, green and blue subpixels SPr, SPg and SPb. Each of the red, green and blue subpixels SPr, SPg and SPb is connected to the gate line GL and the data line DL.

Figures 2, 3:
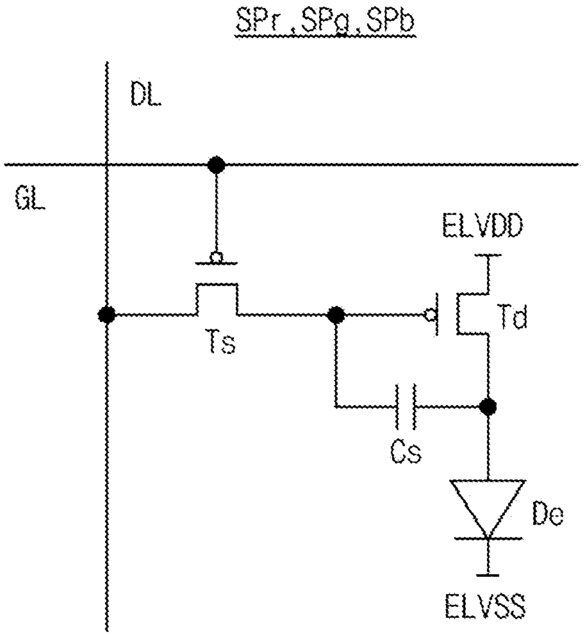
FIG. 2 is a circuit diagram showing a subpixel of a display device according to a first embodiment of the present disclosure.
FIG. 3 is a view showing a refresh rate in various modes of a display device according to a first embodiment of the present disclosure.

Each of the red, green and blue subpixels SPr, SPg and SPb may include a plurality of transistors such as a switching transistor and a driving transistor, a storage capacitor Cs (of FIG. 2) and a light emitting diode De (of FIG. 2).

A structure of the subpixel SP of the display device 110 will be illustrated with reference to a drawing.

FIG. 2 is a circuit diagram showing a subpixel of a display device according to a first embodiment of the present disclosure.

In FIG. 2, each of red, green and blue subpixels SPr, SPg and SPb (SP) of the display panel 135 of the display device 110 according to a first embodiment of the present disclosure includes a switching transistor Ts, a driving transistor Td, a storage capacitor Cs and a light emitting diode De.

The switching transistor Ts supplies the data signal of the data line DL to the driving transistor Td according to the gate signal of the gate line GL.

The driving transistor Td supplies a high level voltage ELVDD to the light emitting diode De according to the data signal of the data line DL applied to a gate electrode thereof through the switching transistor Ts.

The storage capacitor Cs is connected between the gate electrode and the source electrode of the driving transistor Td and stores the data signal applied to the gate electrode of the driving transistor Td.

The light emitting diode De emits a light of various gray levels using a current according to a voltage difference between a voltage of the data signal and a low level voltage ELVSS.

In another embodiment, each of the red, green and blue subpixels SPr, SPg and SPb (SP) may further include an initialization transistor, a reference transistor and an emission transistor other than the switching transistor Ts and the driving transistor Td.

A variable refresh rate operation of the display device 110 will be illustrated with reference to a drawing.

FIG. 3 is a view showing a refresh rate in various modes of a display device according to a first embodiment of the present disclosure.

In FIG. 3, the display device 110 according to a first embodiment of the present disclosure operates with a variable refresh rate (VRR) where an image is displayed by modulating a refresh rate (a frequency) according to a mode.

For example, in a generic user interface (UI) mode where a general user interface is displayed, the display device 110 may operate using a refresh rate of about 10 Hz to about 120 Hz with a touch sensing. In addition, the display device 110 may operate using a refresh rate of about 10 Hz without a touch sensing and without a watch display and may operate using a refresh rate of about 20 Hz without a touch sensing and with a watch display (with a character change or a number change).

In a social network service (SNS) mode where a social network service such as a twitter is displayed, the display device 110 may operate using a refresh rate of about 10 Hz to about 120 Hz with a touch sensing and may operate using a refresh rate of about 10 Hz without a touch sensing.

In a youtube mode where a real time moving image is displayed, the display device 110 may operate using a refresh rate of about 30 Hz to about 120 Hz with a touch sensing and may operate using a refresh rate of about 30 Hz to about 120 Hz without a touch sensing.

In a moving image mode where a stored moving image is displayed, the display device 110 may operate using a refresh rate of about 30 Hz to about 120 Hz with a touch sensing and may operate using a refresh rate of about 30 Hz to about 60 Hz without a touch sensing.

In a camera mode where an object is captured, the display device 110 may operate using a refresh rate of about 30 Hz to about 120 Hz with a touch sensing and may operate using a refresh rate of about 30 Hz to about 60 Hz without a touch sensing.

When the display device 110 operates using a refresh rate of about 120 Hz, the image data of 120 frames each having a duration time of about 8.33 msec may be supplied to the display panel 135 for 1 sec. When the display device 110 operates using a refresh rate of about 60 Hz, the image data of 60 frames each having a duration time of about 16.67 msec may be supplied to the display panel 135 for 1 sec.

When the display device 110 operates using a refresh rate of about 30 Hz, the image data of 30 frames each having a duration time of about 16.67 msec may be supplied to the display panel 135 and 30 frames each having a duration time of about 16.67 msec may be maintained as a blank period where the image data is not supplied for 1 sec. When the display device 110 operates using a refresh rate of about 20 Hz, the image data of 20 frames each having a duration time of about 16.67 msec may be supplied to the display panel 135 and 40 frames each having a duration time of about 16.67 msec may be maintained as a blank period where the image data is not supplied for 1 sec. When the display device 110 operates using a refresh rate of about 1 Hz, the image data of 1 frame having a duration time of about 16.67 msec may be supplied to the display panel 135 and 59 frames each having a duration time of about 16.67 msec may be maintained as a blank period where the image data is not supplied for 1 sec.

The display device 110 according to a first embodiment of the present disclosure may display a consecutive and smooth image by modulating a refresh rate according to a mode and a power consumption may be reduced.

A multi-frame response property of the display device 110 will be illustrated with reference to drawings.

Figure 4A:
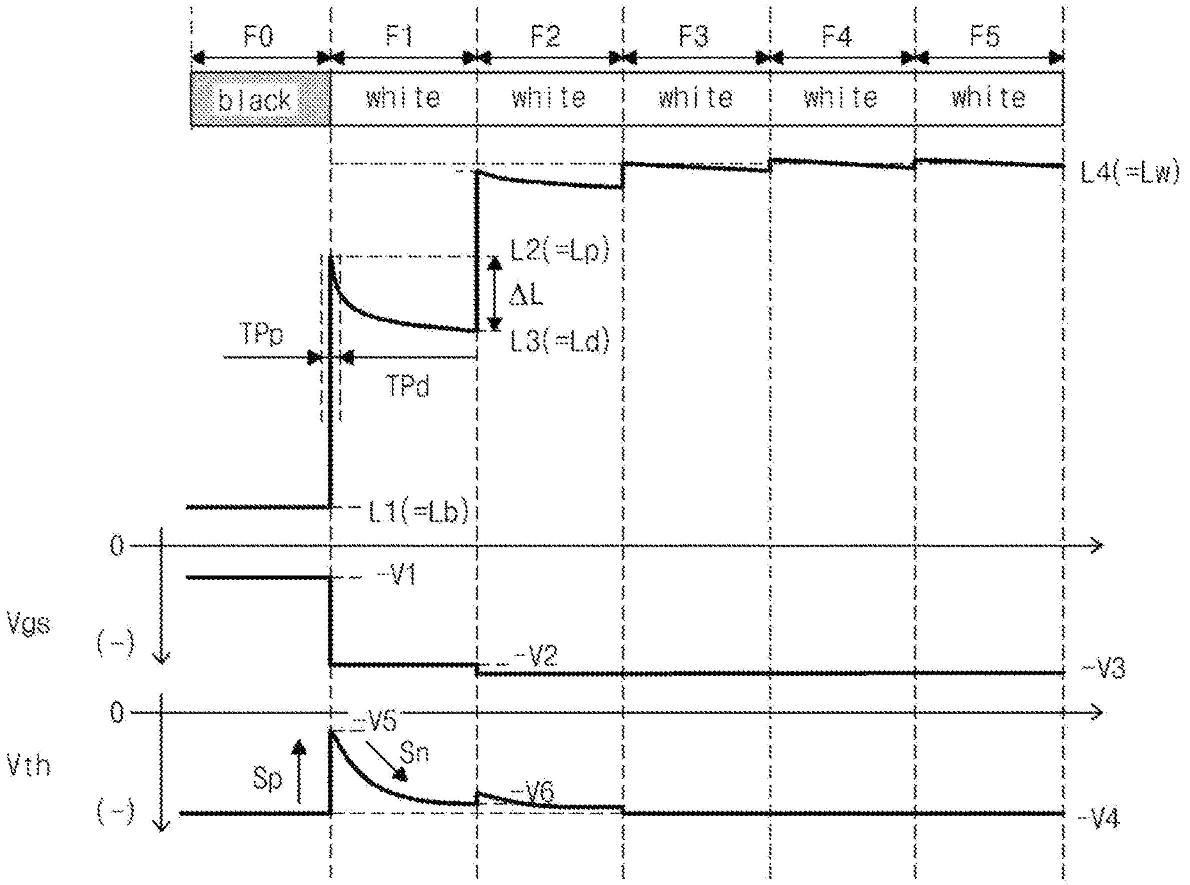
FIG. 4A is a view showing a multi-frame response property of a display device according to a first embodiment of the present disclosure.
Figure 4B:
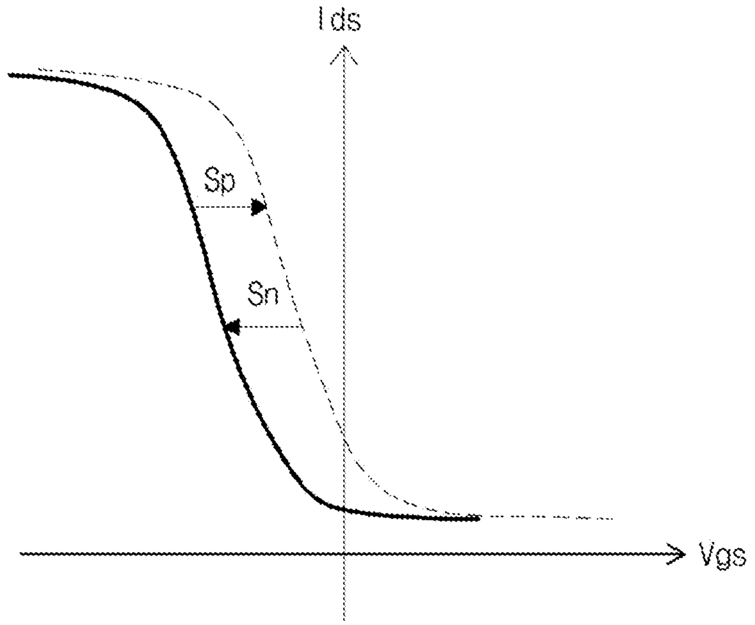
FIG. 4B is a view showing a hysteresis of a driving transistor of a display device according to a first embodiment of the present disclosure.

FIG. 4A is a view showing a multi-frame response property of a display device according to a first embodiment of the present disclosure, and FIG. 4B is a view showing a hysteresis of a driving transistor of a display device according to a first embodiment of the present disclosure.

A multi-frame response (MFR) property is defined as a property of a luminance deviation by frame generated when a black pattern or a white pattern is applied to a display panel for a relatively long time as a stress to the driving transistor Td and then a mid-gray pattern of about 1 Hz is applied to the display panel.

In FIGS. 4A and 4B, after the display device 110 according to a first embodiment of the present disclosure operating with about 1 Hz displays a black pattern for a relatively long time, the display device 110 displays a white pattern. As a result, a threshold voltage Vth of the driving transistor Td has a hysteresis and a luminance deviation is generated by frame due to the hysteresis.

During zeroth frame F0, a gate-source voltage Vgs of the driving transistor Td is a negative first voltage—V1, and a threshold voltage Vth of the driving transistor Td is a negative fourth voltage—V4. The display device 110 displays a first luminance L1 (i.e., a black luminance Lb) corresponding to the black pattern.

Next, during a peak period TPp between the zeroth and first frames F0 and F1, the threshold voltage Vth of the driving transistor Td is shifted toward a positive direction (Sp) to become a negative fifth voltage—V5 higher than the negative fourth voltage—V4, and the gate-source voltage Vgs of the driving transistor Td becomes a negative second voltage—V2 lower than the negative first voltage—V1 and higher than a negative third voltage—V3 of a final voltage. As a result, the display device 110 displays a second luminance L2 (i.e., a peak luminance Lp) higher than the first luminance L1 and lower than a fourth luminance L4 of a final luminance.

During a decay period TPd of a residual period of the first frame F1, the threshold voltage Vth of the driving transistor Td is shifted toward a negative direction (Sn) to become a negative sixth voltage—V6 lower than the negative fifth voltage—V5, and the gate-source voltage Vgs of the driving transistor Td is kept as the negative second voltage—V2. As a result, a luminance displayed by the display device 110 is gradually reduced, and the display device 110 displays a third luminance L3 (i.e., a decay luminance Ld) lower than the second luminance L2.

Since the threshold voltage change, the gate-source voltage change and the luminance change are repeated in second to fifth frames F2 to F5, the gate-source voltage Vgs of the driving transistor Td becomes the negative third voltage—V3 and the threshold voltage Vth of the driving transistor Td becomes the negative fourth voltage—V4 during the fifth frame F5. The display device 110 displays the fourth luminance L4 (i.e., a white luminance Lw) corresponding to the white pattern.

The multi-frame response property may be calculated from a ratio of a luminance deviation ($\Delta L=Lp-Ld$) of a difference between the peak luminance Lp and the decay luminance Ld in each frame with respect to the white luminance Lw of a final luminance. In an operation with a relatively low refresh rate of about 1 Hz, since the multi-frame response property is relatively slow as compared with a relatively high refresh rate, deterioration such as a motion blur may occur and a front of screen (FOS) property may be deteriorated.

In addition, as a temperature increases, the multi-frame response property is deteriorated. As a result, deterioration such as a motion blur may occur and a front of screen (FOS) property may be deteriorated.

A change of a multi-frame response property according to a temperature and a refresh rate will be illustrated with reference to drawings.

Figure 5A:
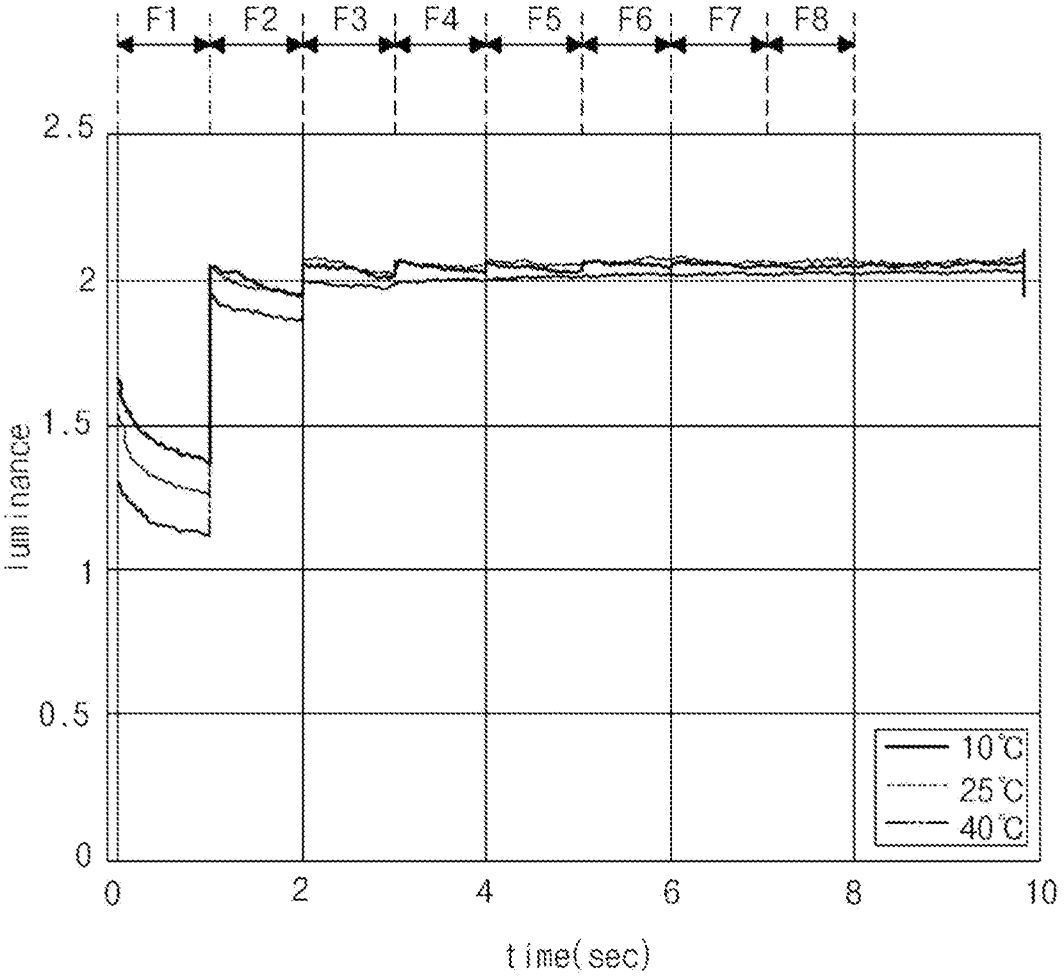
Figures 5B, 6A:
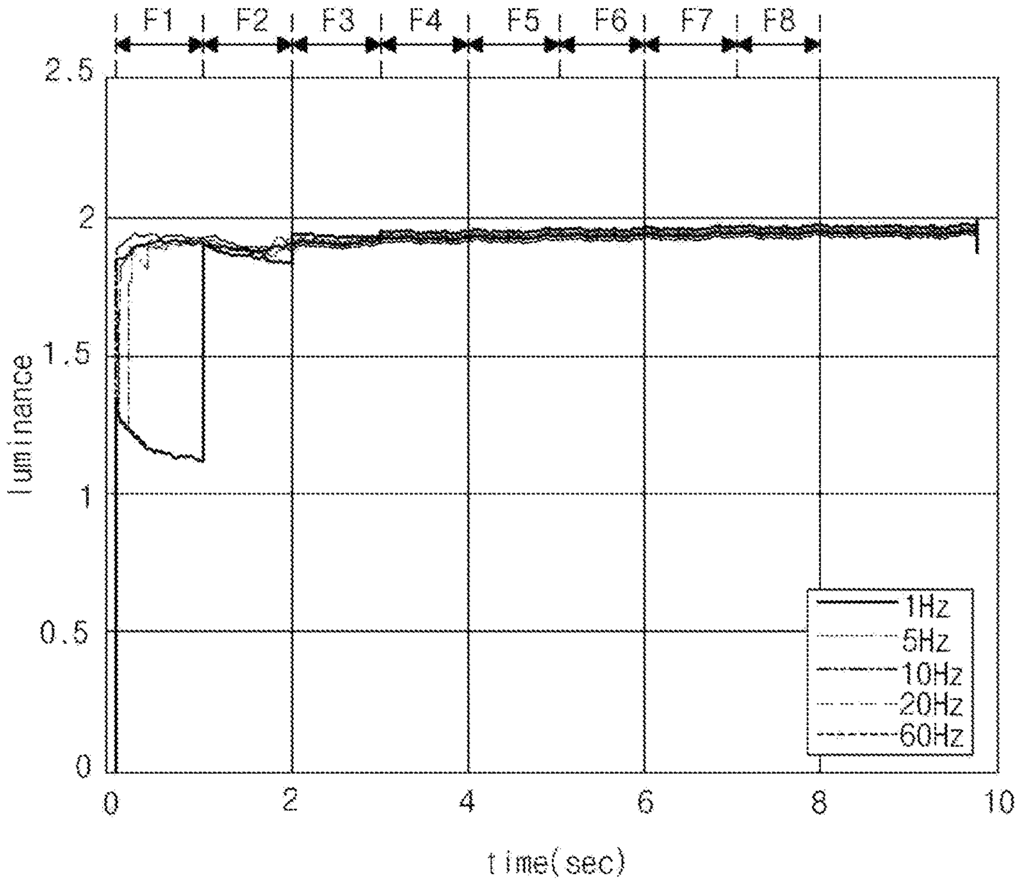

FIGS. 5A and 5B are a graph and a table, respectively, showing a multi-frame response property according to a temperature of a display device according to a first embodiment of the present disclosure, and FIGS. 6A and 6B are a graph and a table, respectively, showing a multi-frame response property according to a refresh rate of a display device according to a first embodiment of the present disclosure.

In FIGS. 5A and 5B, when the white pattern is displayed during 8 frames after the black pattern is displayed during 5 frames, the multi-frame response property is changed differently according to a temperature.

When a temperature is about 10 degrees (Celsius), ratios of the luminance deviations ($\Delta L=Lp-Ld$) in first to eighth frames F1 to F8 with respect to the white luminance Lw are reduced to about 32.10%, about 4.09%, about 1.60%, about 1.07%, about 0.83%, about 0.62%, about 0.68% and about 0.65%, respectively. When a temperature is about 25 degrees, ratios of the luminance deviations ($\Delta L=Lp-Ld$) in first to eighth frames F1 to F8 with respect to the white luminance Lw are reduced to about 38.05%, about 5.16%, about 1.71%, about 0.96%, about 0.68%, about 0.65%, about 0.54% and about 0.66%, respectively. When a temperature is about 40 degrees, ratios of the luminance deviations (ΔL=Lp−Ld) in first to eighth frames F1 to F8 with respect to the white luminance Lw are reduced to about 43.08%, about 6.20%, about 1.50%, about 0.94%, about 0.56%, about 0.54%, about 0.63% and about 0.56%, respectively.

When a temperature is about 10 degrees, about 25 degrees and about 40 degrees, the ratios of the luminance deviations (ΔL=Lp−Ld) in the first frame F1 with respect to the white luminance Lw increases according to a temperature to about 32.10%, about 38.05% and about 43.08%, respectively. Further, the ratios of the luminance deviations (ΔL=Lp−Ld) in the second frame F2 with respect to the white luminance Lw increases according to a temperature to about 4.09%, about 5.16% and about 6.20%, respectively. As a result, the multi-frame response property is deteriorated according to increase of a temperature.

In FIGS. 6A and 6B, when the white pattern is displayed during 8 frames after the black pattern is displayed during 5 frames, the multi-frame response property is changed differently according to a refresh rate.

When a refresh rate is about 1 Hz, ratios of the luminance deviations (ΔL=Lp−Ld) in first to eighth frames F1 to F8 with respect to the white luminance Lw are reduced to about 41.6%, about 6.01%, about 1.67%, about 0.93%, about 0.70%, about 0.49%, about 0.49% and about 0.51%, respectively. When a refresh rate is about 5 Hz, ratios of the luminance deviations (ΔL=Lp−Ld) in first to eighth frames F1 to F8 with respect to the white luminance Lw are reduced to about 4.23%, about 3.53%, about 1.71%, about 0.53%, about 0.63%, about 0.53%, about 0.43% and about 0.48%, respectively. When a refresh rate is about 10 Hz, ratios of the luminance deviations (ΔL=Lp−Ld) in first to eighth frames F1 to F8 with respect to the white luminance Lw are reduced to about 3.80%, about 3.16%, about 1.67%, about 0.88%, about 0.69%, about 0.55%, about 0.51% and about 0.48%, respectively. When a refresh rate is about 20 Hz, ratios of the luminance deviations (ΔL=Lp−Ld) in first to eighth frames F1 to F8 with respect to the white luminance Lw are reduced to about 3.35%, about 2.79%, about 1.40%, about 0.88%, about 0.52%, about 0.52%, about 0.48% and about 0.46%, respectively. When a refresh rate is about 60 Hz, ratios of the luminance deviations (ΔL=Lp−Ld) in first to eighth frames F1 to F8 with respect to the white luminance Lw are reduced to about 3.21%, about 2.67%, about 1.34%, about 0.70%, about 0.52%, about 0.55%, about 0.47% and about 0.48%, respectively.

When a refresh rate is about 1 Hz, about 5 Hz, about 10 Hz, about 20 Hz and about 60 Hz, the ratios of the luminance deviations (ΔL=Lp−Ld) in the first frame F1 with respect to the white luminance Lw decreases according to a refresh rate to about 41.6%, about 4.23%, about 3.80%, about 3.35% and about 3.21%, respectively. Further, the ratios of the luminance deviations (ΔL=Lp−Ld) in the second frame F2 with respect to the white luminance Lw decreases according to a refresh rate to about 6.01%, about 3.53%, about 3.16%, about 2.79% and about 2.67%, respectively. As a result, the multi-frame response property is improved according to increase of a refresh rate.

In the display device 110 according to a first embodiment of the present disclosure, the multi-frame response property is deteriorated according to increase of a temperature and is improved according to increase of a refresh rate. Accordingly, deterioration such as a motion blur may be prevented and deterioration of a display property may be minimized by operating the display device 110 with a sequence of variable refresh rates different according to a temperature.

FIG. 7 is a view showing a variable refresh rate profile with respect to a temperature of a display device according to a first embodiment of the present disclosure.

In FIG. 7, the display device 110 according to a first embodiment of the present disclosure operates with a variable refresh rate such that an image is displayed by modulating a refresh rate (a frequency) according to a mode. For example, a temperature may be classified into a low temperature, a room temperature and a high temperature, and operation may be performed with a variable refresh rate profile different according to a temperature.

When a temperature belongs to a low temperature equal to or lower than about 10 degrees, the display device 110 operates with a first variable refresh rate profile including a first standby mode of a random (infinite) frame number, a touch mode of first to eighth frames F1 to F8 (of FIG. 5A) and a second standby mode of a random (infinite) frame number. The display device 110 operates with a refresh rate of about 1 Hz in the first standby mode of the first variable refresh rate profile. The display device 110 operates with refresh rates of about 10 Hz, about 20 Hz, about 60 Hz, about 30 Hz, about 40 Hz, about 30 Hz, about 20 Hz and about 120 Hz in the first to eighth frames F1 to F8, respectively, of the touch mode of the first variable refresh rate profile. The display device 110 operates with a refresh rate of about 1 Hz in the second standby mode of the first variable refresh rate profile again. The first to eighth frames F1 to F8 of the touch mode of the first variable refresh rate profile have duration times of about 100.0 msec, about 50.0 msec, about 16.7 msec, about 33.3 msec, about 25.0 msec, about 33.3 msec, about 50.0 msec and about 8.3 msec, respectively. Each of the first to eighth frames F1 to F8 of the touch mode of the first variable refresh rate profile has a frame number of one.

When a temperature belongs to a room temperature higher than about 10 degrees and lower than about 50 degrees, the display device 110 operates with a second variable refresh rate profile including a first standby mode of a random (infinite) frame number, a touch mode of first to eighth frames F1 to F8 and a second standby mode of a random (infinite) frame number. The display device 110 operates with a refresh rate of about 2 Hz in the first standby mode of the second variable refresh rate profile. The display device 110 operates with refresh rates of about 11 Hz, about 21 Hz, about 61 Hz, about 31 Hz, about 41 Hz, about 31 Hz, about 21 Hz and about 120 Hz in the first to eighth frames F1 to F8, respectively, of the touch mode of the second variable refresh rate profile. The display device 110 operates with a refresh rate of about 2 Hz in the second standby mode of the second variable refresh rate profile again. The first to eighth frames F1 to F8 of the touch mode of the second variable refresh rate profile have duration times of about 90.9 msec, about 47.6 msec, about 16.4 msec, about 32.3 msec, about 24.4 msec, about 32.3 msec, about 47.6 msec and about 8.3 msec, respectively. Each of the first to eighth frames F1 to F8 of the touch mode of the second variable refresh rate profile has a frame number of one.

When a temperature belongs to a high temperature equal to or higher than about 50 degrees, the display device 110 operates with a third variable refresh rate profile including a first standby mode of a random (infinite) frame number, a touch mode of first to eighth frames F1 to F8 and a second standby mode of a random (infinite) frame number. The display device 110 operates with a refresh rate of about 4 Hz in the first standby mode of the third variable refresh rate profile. The display device 110 operates with refresh rates of about 13 Hz, about 23 Hz, about 63 Hz, about 33 Hz, about 43 Hz, about 33 Hz, about 23 Hz and about 120 Hz in the first to eighth frames F1 to F8, respectively, of the touch mode of the third variable refresh rate profile. The display device 110 operates with a refresh rate of about 4 Hz in the second standby mode of the third variable refresh rate profile again. The first to eighth frames F1 to F8 of the touch mode of the third variable refresh rate profile have duration times of about 76.9 msec, about 43.5 msec, about 15.9 msec, about 30.3 msec, about 23.3 msec, about 30.3 msec, about 43.5 msec and about 8.3 msec, respectively. Each of the first to eighth frames F1 to F8 of the touch mode of the third variable refresh rate profile has a frame number of one.

In the display device 110 according to a first embodiment of the present disclosure, the timing controlling circuit 120 senses a temperature using a temperature sensor and classifies the sensed temperature into a low temperature equal to or lower than about 10 degrees, a room temperature higher than about 10 degrees and lower than about 50 degrees and a high temperature equal to or higher than about 50 degrees. The refresh rate modulating part 122 generates the first, second and third refresh rate profiles corresponding to the low, room and high temperatures, respectively. The timing controlling circuit 120 selects one of the first, second and third refresh rate profiles and operates with a variable refresh rate (a variable refresh rate sequence) different according to a temperature in the standby mode and the touch mode. As a result, a power consumption is reduced and a natural image is displayed. Further, since deterioration such as a motion blur is prevented, deterioration of a display property is minimized.

The first, second and third variable refresh rate profiles may be generated such that the refresh rate increases as the temperature increases.

For example, when a plurality of frames of the standby mode and the touch mode in the low temperature have a first variable refresh rate profile of refresh rates of (a, b, c, d, e, . . . ), a plurality of frames of the standby mode and the touch mode in the room temperature may have a second variable refresh rate profile of refresh rates of (a+(1~2), b+(1~2), c+(1~2), d+(1~2), e+(1~2), . . . ) greater than the first variable refresh rate profile by 1 Hz to 2 Hz, and a plurality of frames of the standby mode and the touch mode in the high temperature may have a third variable refresh rate profile of refresh rates of (a+(3~4), b+(3~4), c+(3~4), d+(3~4), e+(3~4), . . . ) greater than the first variable refresh rate profile by 3 Hz to 4 Hz.

In another embodiment where the refresh rate sequence and the frame number sequence of the variable refresh rate profile of the touch mode are variously changed, each refresh rate of the plurality of frames of the variable refresh rate profile of the touch mode may increase according to increase of the temperature.

Although both of the refresh rate of the standby mode and the touch mode are modulated according to a temperature in a first embodiment, only the refresh rate and the duration time of the first frame of the touch mode may be modulated according to a temperature in another embodiment.

Figure 9:
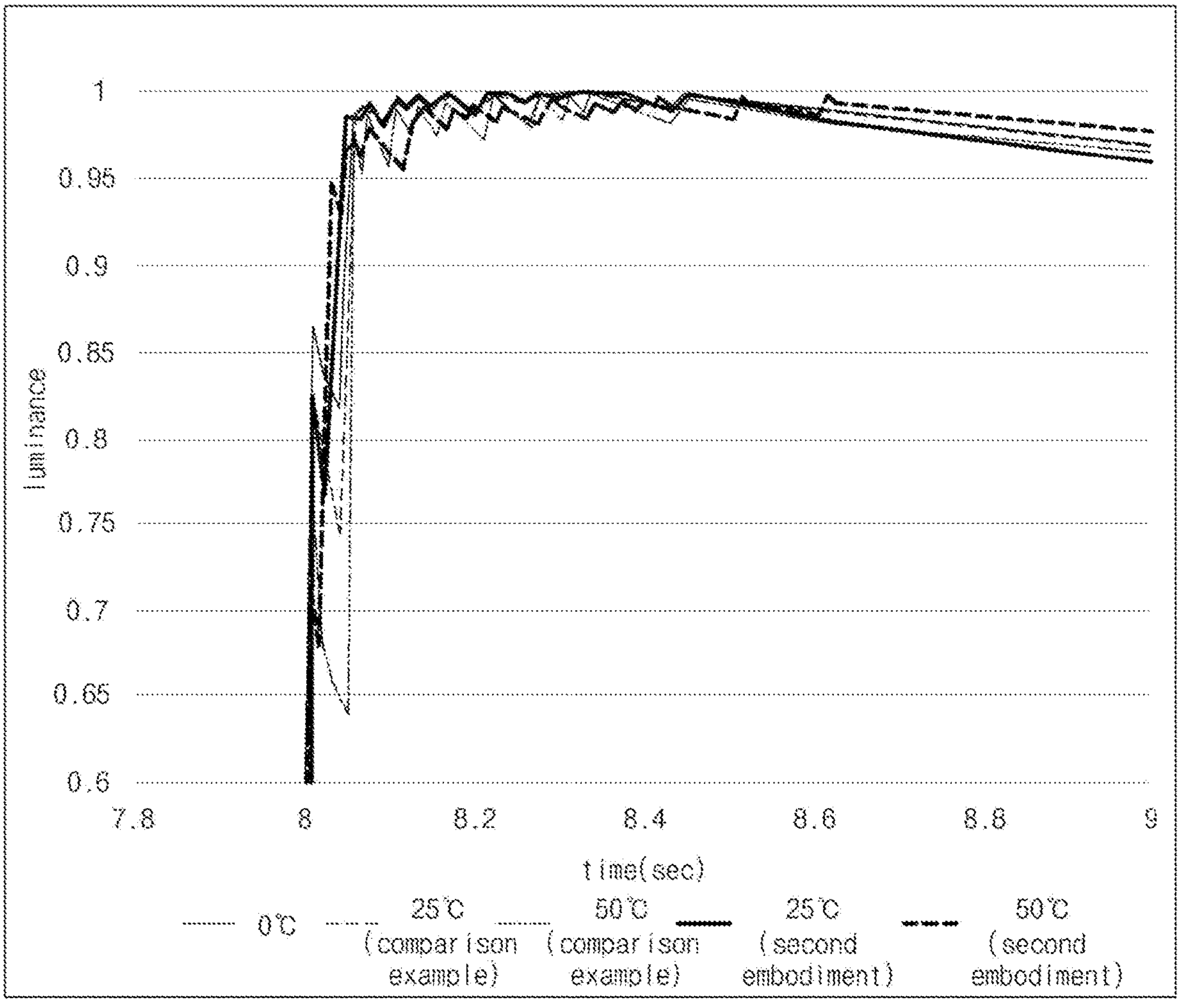
FIG. 9 is a graph showing a multi-frame response property with respect to a temperature of a display device according to a second embodiment of the present disclosure.

FIG. 8 is a view showing a variable refresh rate profile with respect to a temperature of a display device according to a second embodiment of the present disclosure, and FIG. 9 is a graph showing a multi-frame response property with respect to a temperature of a display device according to a second embodiment of the present disclosure. Illustration on a part the same as that of a first embodiment will be omitted.

In FIG. 8, a display device according to a second embodiment of the present disclosure operates with a variable refresh rate such that an image is displayed by modulating a refresh rate (a frequency) according to a mode. For example, a temperature may be classified into a low temperature, a room temperature and a high temperature, and operation may be performed with a variable refresh rate profile different according to a temperature.

When a temperature belongs to a low temperature equal to or lower than about 10 degrees, the display device operates with a first variable refresh rate profile including a first standby mode of a random (infinite) frame number, a touch mode of first to thirteenth frames and a second standby mode of a random (infinite) frame number. The display device operates with a refresh rate of about 1 Hz in the first standby mode of the first variable refresh rate profile. The display device operates with refresh rates of about 10 Hz, about 20 Hz, about 60 Hz, about 30 Hz, about 40 Hz, about 30 Hz, about 20 Hz, about 120 Hz, about 20 Hz, about 30 Hz, about 40 Hz, about 80 Hz and about 10 Hz in the first to thirteenth frames, respectively, of the touch mode of the first variable refresh rate profile. The display device operates with a refresh rate of about 1 Hz in the second standby mode of the first variable refresh rate profile again.

The first to thirteenth frames of the touch mode of the first variable refresh rate profile have duration times of about 100.0 msec, about 50.0 msec, about 16.7 msec, about 33.3 msec, about 25.0 msec, about 33.3 msec, about 50.0 msec, about 8.3 msec, about 50.0 msec, about 33.3 msec, about 25.0 msec, about 13.3 msec and about 100.0 msec, respectively. Each of the first to thirteenth frames of the touch mode of the first variable refresh rate profile has a frame number of one.

When a temperature belongs to a room temperature higher than about 10 degrees and lower than about 50 degrees, the display device operates with a second variable refresh rate profile including a first standby mode of a random (infinite) frame number, a touch mode of first to thirteenth frames and a second standby mode of a random (infinite) frame number. The display device operates with a refresh rate of about 1 Hz in the first standby mode of the second variable refresh rate profile. The display device operates with refresh rates of about 20 Hz, about 20 Hz, about 60 Hz, about 30 Hz, about 40 Hz, about 30 Hz, about 20 Hz, about 120 Hz, about 20 Hz, about 30 Hz, about 40 Hz, about 80 Hz and about 10 Hz in the first to thirteenth frames, respectively, of the touch mode of the second variable refresh rate profile. The display device operates with a refresh rate of about 1 Hz in the second standby mode of the second variable refresh rate profile again.

The first to thirteenth frames of the touch mode of the second variable refresh rate profile have duration times of about 100.0 msec, about 50.0 msec, about 16.7 msec, about 33.3 msec, about 25.0 msec, about 33.3 msec, about 50.0 msec, about 8.3 msec, about 50.0 msec, about 33.3 msec, about 25.0 msec, about 13.3 msec and about 100.0 msec, respectively. The first frame of the touch mode of the second variable rate profile has a frame number of two, and each of the second to thirteenth frames of the touch mode of the second variable refresh rate profile has a frame number of one.

When a temperature belongs to a high temperature equal to or higher than about 50 degrees, the display device operates with a third variable refresh rate profile including a first standby mode of a random (infinite) frame number, a touch mode of first to thirteenth frames and a second standby mode of a random (infinite) frame number. The display device operates with a refresh rate of about 1 Hz in the first standby mode of the third variable refresh rate profile. The display device operates with refresh rates of about 40 Hz, about 20 Hz, about 60 Hz, about 30 Hz, about 40 Hz, about 30 Hz, about 20 Hz, about 120 Hz, about 20 Hz, about 30 Hz, about 40 Hz, about 80 Hz and about 10 Hz in the first to thirteenth frames, respectively, of the touch mode of the third variable refresh rate profile. The display device operates with a refresh rate of about 1 Hz in the second standby mode of the third variable refresh rate profile again.

The first to thirteenth frames of the touch mode of the third variable refresh rate profile have duration times of about 100.0 msec, about 50.0 msec, about 16.7 msec, about 33.3 msec, about 25.0 msec, about 33.3 msec, about 50.0 msec, about 8.3 msec, about 50.0 msec, about 33.3 msec, about 25.0 msec, about 13.3 msec and about 100.0 msec, respectively. The first frame of the touch mode of the third variable refresh rate profile has a frame number of four, and each of the first to thirteenth frames of the touch mode of the third variable refresh rate profile has a frame number of one.

In FIG. 9, when a white pattern is displayed during 8 frames or more after a black pattern is displayed during 8 frames, multi-frame response properties in a first frame immediately after change to the white pattern of a comparison example and a second embodiment are changed differently according to a temperature.

A display device according to a comparison example operates with the same variable refresh rate profile (e.g., the variable refresh rate profile of the low temperature of FIG. 8) in a low temperature (about 0 degree), a room temperature (about 25 degrees) and a high temperature (about 50 degrees). The display device according to a second embodiment of the present disclosure operates with different variable refresh rates (e.g., the variable refresh rate profiles of the low, room and high temperatures of FIG. 8) in a low temperature (about 0 degree), a room temperature (about 25 degrees) and a high temperature (about 50 degrees).

In the display device according to a comparison example, a luminance difference according to a temperature in the first frame immediately after change to the white pattern is not sufficiently stabilized within about 100 msec. In the display device according to a second embodiment of the present disclosure, a luminance difference according to a temperature in the first frame immediately after change to the white pattern is sufficiently stabilized and minimized within about 100 msec.

Since the display device according to a second embodiment of the present disclosure operates with the refresh rate and the frame number different according to a temperature in the first frame immediately after change of modes, the luminance difference according to a temperature is more promptly stabilized as compared with the comparison example and deterioration of the multi-frame response property according to a temperature is minimized.

In the display device according to a second embodiment of the present disclosure, the timing controlling circuit senses a temperature using a temperature sensor and classifies the sensed temperature into a low temperature equal to or lower than about 10 degrees, a room temperature higher than about 10 degrees and lower than about 50 degrees and a high temperature equal to or higher than about 50 degrees. The refresh rate modulating part generates the first, second and third refresh rate profiles corresponding to the low, room and high temperatures, respectively. The timing controlling circuit selects one of the first, second and third refresh rate profiles and operates with a variable refresh rate (a variable refresh rate sequence) and a frame number (a frame number sequence) different according to a temperature in the touch mode. As a result, a power consumption is reduced and a natural image is displayed. Further, since deterioration such as a motion blur is prevented, deterioration of a display property is minimized.

In addition, since the display device operates with a refresh rate and a frame number according to a temperature in the first frame of the touch mode, change of a data driving circuit (e.g., an integrated circuit) is not required and a fabrication cost is reduced. Since a stabilization is performed for the same time period in low, room and high temperatures, deterioration of a display property is minimized.

The first, second and third variable refresh rate profiles may be generated such that the refresh rate and the frame number increase as the temperature increases.

For example, when a plurality of frames of the touch mode in the low temperature have a first variable refresh rate profile of refresh rates of (a, b, c, d, e, . . . ) and frame numbers of (1, 1, 1, 1, 1, . . . ), a plurality of frames of the touch mode in the room temperature may have a second variable refresh rate profile of refresh rates of (2a, b, c, d, e, . . . ) and frame numbers of (2, 1, 1, 1, 1, . . . ) where the refresh rate and the frame number of the first frame of the room temperature are twice of the refresh rate and the frame number of the first frame of the low temperature, and a plurality of frames of the touch mode in the high temperature may have a third variable refresh rate profile of refresh rates of (4a, b, c, d, e, . . . ) and frame numbers of (4, 1, 1, 1, 1, . . . ) where the refresh rate and the frame number of the first frame of the high temperature are four times of the refresh rate and the frame number of the first frame of the low temperature. The first frames of the touch mode of the low, room and high temperatures may have the same duration time (the same holding time).

In another embodiment where the refresh rate sequence and the frame number sequence of the variable refresh rate profile of the touch mode are variously changed, each refresh rate and each frame number of the first frame of the variable refresh rate profile of the touch mode may increase as a multiple according to increase of the temperature.

It will be apparent to those skilled in the art that various modifications and variation can be made in the present disclosure without departing from the scope of the disclosure. Thus, the scope of the present disclosure is intended to cover the modifications and variations of the contents included in this disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:

a display panel configured to display an image based on a gate signal and a data signal;

a gate driving circuit configured to generate the gate signal based on a gate control signal;

a data driving circuit configured to generate the data signal based on a data control signal and an image data; and a timing controlling circuit configured to:

generate the gate control signal, the data control signal, and the image data based on an image signal and a plurality of timing signals; and transmit the gate control signal, the data control signal, and the image data with a variable refresh rate profile different based on a temperature, wherein the variable refresh rate profile includes first, second, and third variable refresh rate profiles each having a refresh rate, wherein the timing controlling circuit is configured to classify the temperature into low temperature, room temperature, and high temperature and operate with the first, second, and third variable refresh rate profiles in the low temperature, room temperature, and high temperature, respectively, wherein the low temperature is lower than the room temperature, wherein the high temperature is higher than the room temperature, wherein each of the first, second, and third variable refresh rate profiles includes a plurality of frames, and wherein the refresh rate of the plurality of frames of the second variable refresh rate profile is greater than the refresh rate of the plurality of frames of the first variable refresh rate profile by 1 Hz to 2 Hz.

2. The display device of claim 1, wherein the low temperature is equal to or lower than 10 degrees, the room temperature is higher than 10 degrees and lower than 50 degrees, and the high temperature is equal to or higher than 50 degrees.

3. The display device of claim 1, wherein the refresh rate of the plurality of frames of the second variable refresh rate profile is smaller than the refresh rate of the plurality of frames of the third variable refresh rate profile.

4. The display device of claim 3, wherein the refresh rate of the plurality of frames of the third variable refresh rate profile is greater than the refresh rate of the plurality of frames of the first variable refresh rate profile by 3 Hz to 4 Hz.

5. A display device, comprising:

a display panel configured to display an image based on a gate signal and a data signal;

a gate driving circuit configured to generate the gate signal based on a gate control signal;

a data driving circuit configured to generate the data signal based on a data control signal and an image data; and a timing controlling circuit configured to:

generate the gate control signal, the data control signal, and the image data based on an image signal and a plurality of timing signals; and transmit the gate control signal, the data control signal, and the image data with a variable refresh rate profile different based on a temperature, wherein the variable refresh rate profile includes first, second, and third variable refresh rate profiles each having a refresh rate, wherein the timing controlling circuit is configured to classify the temperature into low temperature, room temperature, and high temperature and operate with the first, second, and third variable refresh rate profiles in the low temperature, room temperature, and high temperature, respectively, wherein the low temperature is lower than the room temperature, wherein the high temperature is higher than the room temperature, wherein each of the first, second, and third variable refresh rate profiles includes a first standby mode, a touch mode, and a second standby mode, wherein the refresh rate and a frame number of a first frame of the touch mode of the second variable refresh rate profile are greater than the refresh rate and the frame number of a first frame of the touch mode of the first variable refresh rate profile, and wherein the first frames of the touch mode of the first and second variable refresh rate profiles have a same duration time as each other.

6. The display device of claim 5, wherein the refresh rate and the frame number of the first frame of the touch mode of the second variable refresh rate profile are smaller than the refresh rate and the frame number of a first frame of the touch mode of the third variable refresh rate profile.

7. The display device of claim 6, wherein the refresh rate and the frame number of the first frame of the touch mode of the second variable refresh rate profile are twice of the refresh rate and the frame number of the first frame of the touch mode of the first variable refresh rate profile.

8. The display device of claim 7, wherein the refresh rate and the frame number of the first frame of the touch mode of the third variable refresh rate profile are four times of the refresh rate and the frame number of the first frame of the touch mode of the first variable refresh rate profile.

9. The display device of claim 5, wherein the first frame of the touch mode of the third variable refresh rate profile has a same duration time as the first frames of the touch mode of the first and second variable refresh rate profiles.

10. A method of driving a display device, comprising:

generating, by a timing controlling circuit, a gate control signal, a data control signal, and an image data based on an image signal and a plurality of timing signals;

transmitting, by the timing controlling circuit, the gate control signal, the data control signal, and the image data with a variable refresh rate profile different based on a temperature;

generating, by a data driving circuit, a data signal based on the data control signal and the image data;

generating, by a gate driving circuit, a gate signal based on the gate control signal;

displaying, by a display panel, an image based on the gate signal and the data signal;

classifying, by the timing controlling circuit, the temperature into low temperature, room temperature, and high temperature; and operating the timing controlling circuit with the first, second, and third variable refresh rate profiles in the low, room and high temperatures, respectively, wherein the variable refresh rate profile includes first, second, and third variable refresh rate profiles each having a refresh rate, wherein each of the first, second, and third variable refresh rate profiles includes a plurality of frames, and wherein the refresh rate of the plurality of frames of the second variable refresh rate profile is greater than the refresh rate of the plurality of frames of the first variable refresh rate profile by 1 Hz to 2 Hz.

11. The method of claim 10, wherein the low temperature is equal to or lower than 10 degrees, the room temperature is higher than 10 degrees and lower than 50 degrees, and the high temperature is equal to or higher than 50 degrees.

12. The method of claim 10, wherein the refresh rate of the plurality of frames of the second variable refresh rate profile is smaller than the refresh rate of the plurality of frames of the third variable refresh rate profile.

13. The method of claim 12, wherein the refresh rate of the plurality of frames of the third variable refresh rate profile is greater than the refresh rate of the plurality of frames of the first variable refresh rate profile by 3 Hz to 4 Hz.

14. A method of driving a display device, comprising:

generating, by a timing controlling circuit, a gate control signal, a data control signal, and an image data based on an image signal and a plurality of timing signals;

transmitting, by the timing controlling circuit, the gate control signal, the data control signal, and the image data with a variable refresh rate profile different based on a temperature;

generating, by a data driving circuit, a data signal based on the data control signal and the image data;

generating, by a gate driving circuit, a gate signal based on the gate control signal;

displaying, by a display panel, an image based on the gate signal and the data signal;

classifying, by the timing controlling circuit, the temperature into low temperature, room temperature, and high temperature; and operating the timing controlling circuit with the first, second, and third variable refresh rate profiles in the low, room and high temperatures, respectively, wherein the variable refresh rate profile includes first, second, and third variable refresh rate profiles each having a refresh rate, wherein each of the first, second, and third variable refresh rate profiles includes a first standby mode, a touch mode, and a second standby mode, wherein the refresh rate and a frame number of a first frame of the touch mode of the second variable refresh rate profile are greater than the refresh rate and the frame number of a first frame of the touch mode of the first variable refresh rate profile, and wherein the first frames of the touch mode of the first and second variable refresh rate profiles have a same duration time as each other.

15. The method of claim 14, wherein the refresh rate and the frame number of the first frame of the touch mode of the second variable refresh rate profile are smaller than the refresh rate and the frame number of the first frame of the touch mode of the third variable refresh rate profile.

16. The method of claim 15, wherein the refresh rate and the frame number of the first frame of the touch mode of the second variable refresh rate profile are twice of the refresh rate and the frame number of the first frame of the touch mode of the first variable refresh rate profile, and wherein the refresh rate and the frame number of the first frame of the touch mode of the third variable refresh rate profile are four times of the refresh rate and the frame number of the first frame of the touch mode of the first variable refresh rate profile.

17. The method of claim 15, wherein the first frame of the touch mode of the third variable refresh rate profile has a same duration time as the first frames of the touch mode of the first and second variable refresh rate profiles.

* * * * *